United States Patent

[11] 3,584,447

[72] Inventors Alton H. Wilson.
7224 Government St.;
Douglas E. Ripley, Sr., 675 Wooddale Blvd,
Apt. No. 87, both of Baton Rouge, La.
70806
[21] Appl. No. 726,921
[22] Filed May 6, 1968
[45] Patented June 15, 1971

[54] DROP THROUGH CUTTING HEAD AND
GATHERING DEVICE
2 Claims, 9 Drawing Figs.
[52] U.S. Cl. .................................................. 56/340
[51] Int. Cl. .................................................... A01g 19/08
[50] Field of Search ........................................ 56/340

[56] References Cited
UNITED STATES PATENTS
| 123,630 | 2/1872 | Hicks | 56/340 |
| 497,202 | 5/1893 | Ohman | 56/340 |
| 964,108 | 7/1910 | Johnson | 56/340 |
| 3,397,526 | 8/1968 | Barrow | 56/340 |

FOREIGN PATENTS
| 594,837 | 9/1925 | France | 56/340 |

Primary Examiner—Robert Peshock
Attorney—Robert G. McMorrow

ABSTRACT: A gathering and severance device for harvesting fruit wherein a basket with an elongated handle has a top portion with an overlying open frame cutter having openings to receive the fruit therethrough and severing means, and has conveying means associated therewith whereby the severed fruit is transferred to a collection area.

PATENTED JUN 15 1971 3,584,447

INVENTORS.
ALTON H. WILSON
DOUGLAS E. RIPLEY, SR.

BY *Robert J. McMorrow*
ATTORNEY

PATENTED JUN 15 1971 3,584,447

INVENTORS,
ALTON H. WILSON
DOUGLAS E. RIPLEY, SR.

BY *Robert G. McMorrow*

ATTORNEY 3,584,447

DROP THROUGH CUTTING HEAD AND GATHERING DEVICE

BACKGROUND OF THE INVENTION

1. Field of the Invention

This invention relates to harvesting means for tree grown fruits, and to means for severance and collection of the fruits.

2. Statement of the Prior Art

In agricultural devices employed in fruit harvesting it has heretofore been proposed to provide gathering frames having elongated handles, and having cutters and baskets associated with the handles. Prior patents in this area of interest include the following:

| Patentee | Patent No. | Issue date |
| --- | --- | --- |
| E. H. Newcomb | 55,150 | May 29, 1866. |
| E. Case | 256,818 | April 25, 1882. |
| T. C. Schultze | 1,373,531 | April 5, 1921. |
| J. A. Rich | 2,131,672 | Sept. 27, 1938. |
| R. V. Harrison | 2,675,664 | April 20, 1954. |
| E. H. Warner | 2,829,814 | April 8, 1958. |
| R. Peacock | 3,247,658 | April 26, 1966. |

These prior devices, in the main, are limited to operation on a single item thus imposing a requirement for the provision of multiple apparatus where different fruits are to be gathered, and also, the previously known devices harvest only a single item on each activation thereof.

SUMMARY OF THE INVENTION

The present invention relates to apparatus which provides the multiple function of severance of growing fruit, gathering of the fruit, and transfer of the fruit to a collection area. The invention moreover provides means for action on a number of articles simultaneously where growing conditions permit, and is readily modified for accommodation of fruits of different types and sizes. A primary advantage of the invention resides therefor in the provision of a single tool for performing all of the above functions.

Additional advantages hereof reside in the details of the particular severance means employed in the invention. The invention, in that connection, readily separates growing fruit from a tree or the like with a minimized possibility of damage to the fruit during handling. The fruit is conveyed from a catch basket associated with the severance means to a collection area by chute means forming a part of the invention, and it is unnecessary for the operator to touch the fruit. This avoids contamination of the fruit as well as reducing the cost of harvesting.

Additional objectives and advantages include the provision of apparatus which may be operated from a vehicle-mounted platform, and may be arranged in groups for operation in multiple growing areas. This makes possible the harvesting of fruit from a number of trees and transfer of the harvested fruit to a central collection area thereafter.

The invention provides apparatus of the character indicated which is simple and noncomplex in construction, adapted for manufacture at low cost, and requires minimum training for use.

Other and further objects and advantages of the invention will become apparent to those skilled in the art from a consideration of the following specification when read in conjunction with the annexed drawings.

DESCRIPTION OF THE PREFERRED EMBODIMENTS

Figure 9:
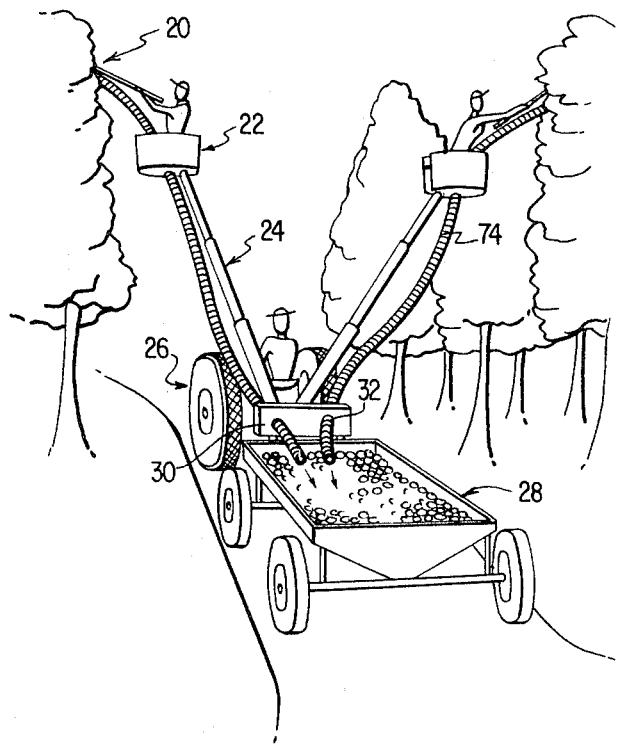
FIG. 9 is a perspective view showing a preferred environment of use.

Reference numeral 20 generally identifies apparatus constructed in accordance with this invention in the drawings. The apparatus 20 is used in the harvesting of fruits such as oranges, apples, bunched small fruits and the like, in orchards where trees are often arranged in groups or rows. As shown in FIG. 9, the apparatus 20 is essentially a hand held device, and the operator is preferably positioned on a platform 22 of variable height located on a boom 24 which is extendable and retractable and is mounted on a tractor 26 or other suitable prime mover. There may be two or more such booms for each prime mover, and the prime mover may be driven between rows of fruit trees. Trailing behind or otherwise connected to the vehicle is a trailer 28 comprising a collection area for harvested fruit. In the illustrated example of the invention, the trailer has a front panel 30 with hose openings 32 formed therein for a purpose appearing below.

The apparatus 20 of this invention comprises means for severance of growing fruits and for transfer of the fruit from its growing location to the trailer 28 or other collection area. In meeting these objectives, the apparatus includes a basket 34 formed of metal, plastic, or the like. The basket includes a forward wall portion 36, rear wall 38, and a base portion 40. The base portion 40 may optionally be of the same material of fabrication as the remainder of the basket, or it may be of some nonrigid material. In the preferred form of the invention it is of metal or plastic, and includes sloping sides 42, 44 and a central channel 46. At the terminus of the channel 46, the rear wall 38 has an opening 48 formed therein with an outwardly extended hose coupling 50 connected thereto.

Figure 1:
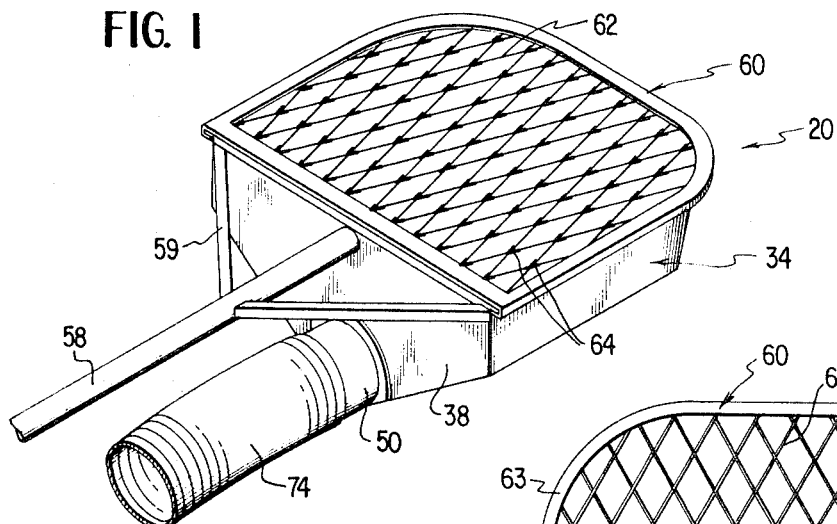
FIG. 1 is a perspective view of an operating portion of the invention with portions thereof broken away for clarity of illustration.
Figure 2:
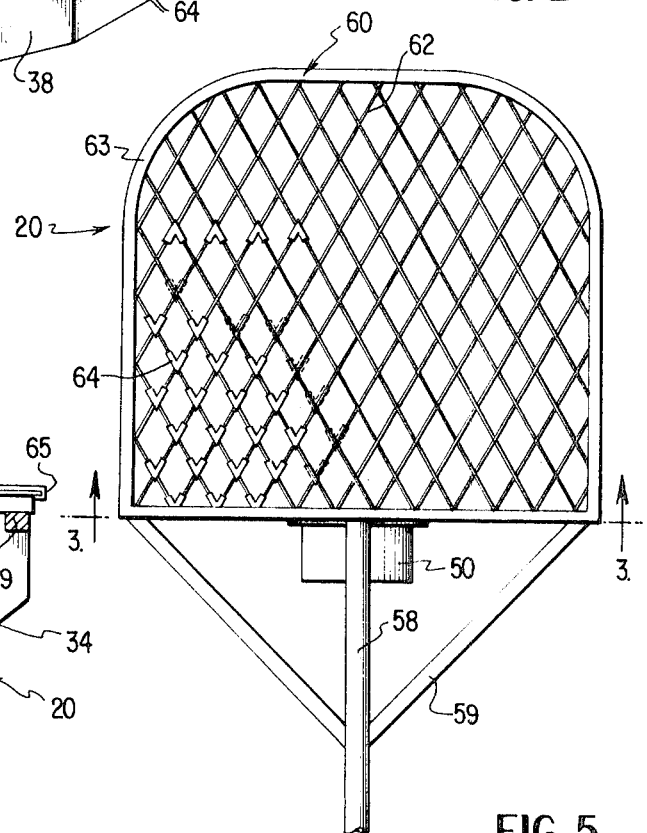
FIG. 2 is an enlarged plan view of the apparatus of FIG. 1 showing in one portion thereof optional cutter means employed with the invention.
Figure 3:
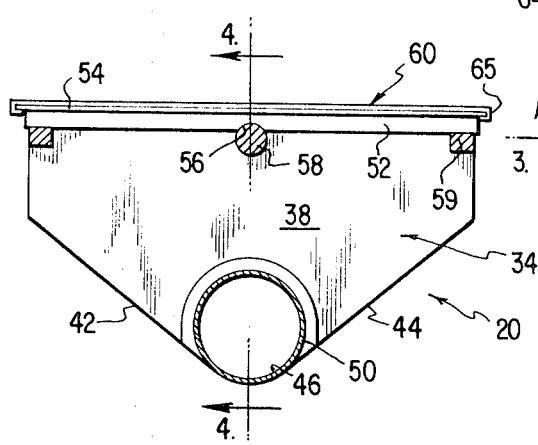
FIG. 3 is a sectional view taken substantially on the plane of the section line 3-3 of FIG. 2 looking in the direction of the arrows.
Figure 4:
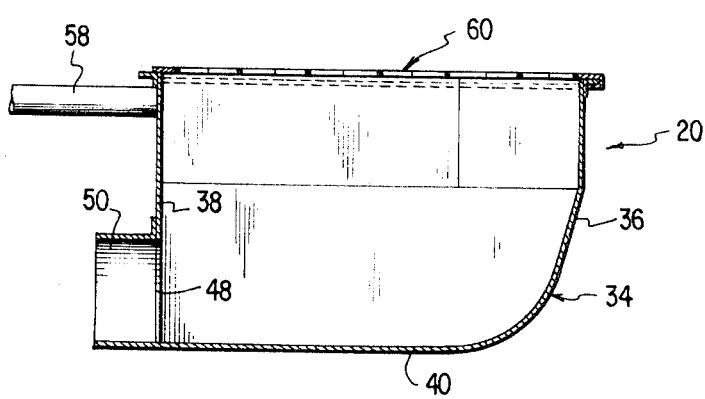
FIG. 4 is a medial, vertical cross sectional view taken substantially on the section line 4-4 of FIG. 3, looking in the direction of the arrows.
Figure 5:
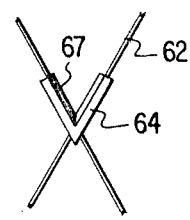
FIG. 5 is an enlarged plan view of the severance means.

A rigid frame 52 is affixed peripherally about the basket upper portion and includes an upper rim 54, defining the open top of the basket. At the rear wall 38 of the basket an elongated handle 58 is affixed thereto and as shown in Figure 3, the handle 58 extends into a portion 56 of the rim 52. Suitable braces 59 extend from the handle to the rear wall of the basket.

Figure 6:
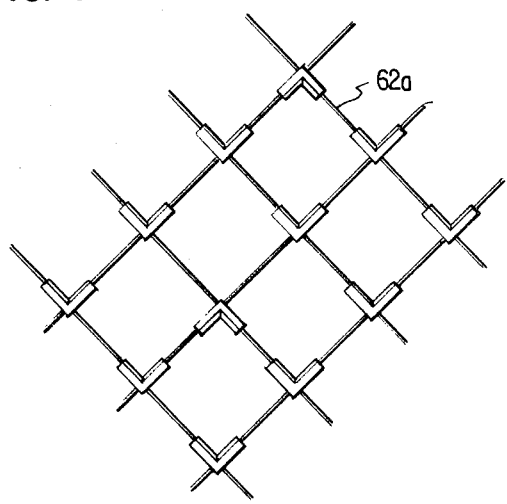
FIG. 6 is a further plan view showing a modification.

A main component of this invention is a removable cutter 60. The cutter takes various forms and dimensions, each of which is specially formed for a particular type of fruit to be harvested therewith. In FIGS. 1 through 5, a first form of the cutter is shown. Here it comprises the plurality of wire elements 62 affixed in a frame 63 having channel form ends 65 which engage the rim 54 of the basket in the manner indicated in Figure 3. The wire elements 62 are fixed to this frame in a grid form defining generally diamond shaped openings. The elements may also be affixed to the rim in such manner as to form an open square pattern (62a in Figure 6). In a further modification of either of these arrangements of the wire elements, sharpened cutting blades 64 each of V-form and having blades 67 on their inwardly facing surfaces may be secured to the wires at the intersections thereof in the manner best shown in FIG. 5.

Figure 7:
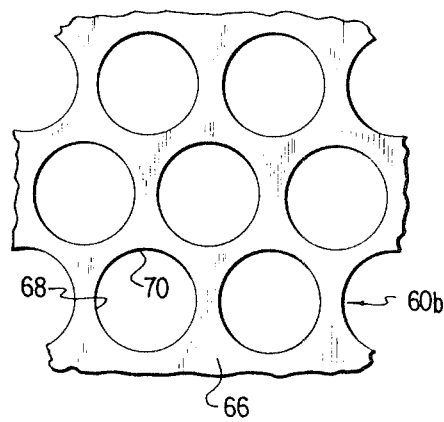
FIG. 7 shows a further modified form of the invention in plan view.
Figure 8:
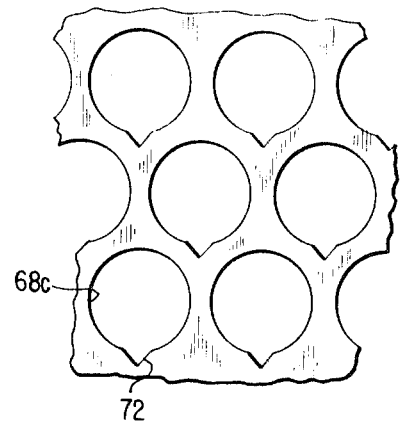
FIG. 8 shows a still further modification in plan view.

Further alternatives of construction for the cutting means are shown in FIGS. 7 and 8. In the former, the open frame cutter 60b comprises a plate 66 having a plurality of circular openings 68 formed therein, the surrounding edges 70 of which are preferably sharpened. A modification of this is shown in FIG. 8, wherein the openings 68c have cutter notches 72 adapted particularly to engage stems of certain types of fruit during harvesting.

The prime mover 26 is driven to a fruit harvesting area and the platforms are conveniently arranged by extension and retraction of the boom means 24. If desired, the adjustment for the boom means can be from the platform 22. As the operator manipulates the gathering device through movement of the handle 58, the basket is positioned under the fruit to be harvested which drops through the openings therein, that is, between the wire elements or through the openings 68 and 68c. The device is then raised and the fruits drop into the basket as the operator slightly pushes or pulls the basket thus severing the fruit. The fruit then gravitates into the channel 46 and through the hose nozzle 46.

Transfer of the severed fruit from the basket 34 to the collection area or trailer 28 is by means of a flexible hose 74 connected at one end to the coupling 50 and at its other end extending through the openings 32 and the panel 30. The transfer may be by force of gravity alone, or suitable suction means may be employed with the hose.

We claim:

Claim 1. A fruit gathering apparatus for use in the severance of fruit from a tree and transfer of the fruit to a collection area, the apparatus comprising:
  basket means including a top rim defining an open top, and a base;
  handle means secured to the basket means and extending therefrom;
  the base having outlet means therein for release of the fruit from the basket means to the collection area;
  an open frame cutter secured to the rim and having openings therein dimensioned to admit the fruit therethrough;
  the open frame cutter comprising a plurality of wires elements arranged in grid form;
  the grid including a plurality of intercept portions; and
  a generally V-shaped cutter affixed to the wires at at least some of the intercept portions.

Claim 2. A fruit gathering apparatus for use in the severance of fruit from a tree and transfer of the fruit to a collection area, said apparatus comprising:
  basket means including a top rim defining an open top, and a base;
  handle means secured to the basket means and extending therefrom;
  the base having outlet means therein for release of the fruit from the basket means to the collection area;
  an open frame cutter secured to the rim and comprising a plurality of intersecting wires defining intercept portions and cutter means disposed at the intercept portions.